June 6, 1961    H. M. CORTNER    2,987,023
SOLDER FEEDING DEVICE
Filed Dec. 2, 1958    2 Sheets-Sheet 1
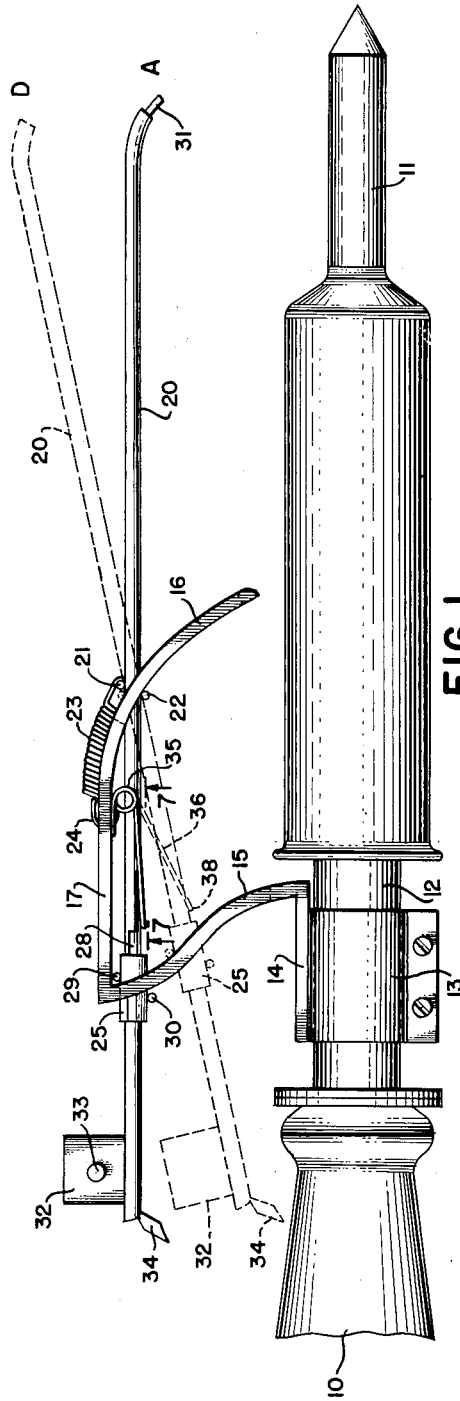
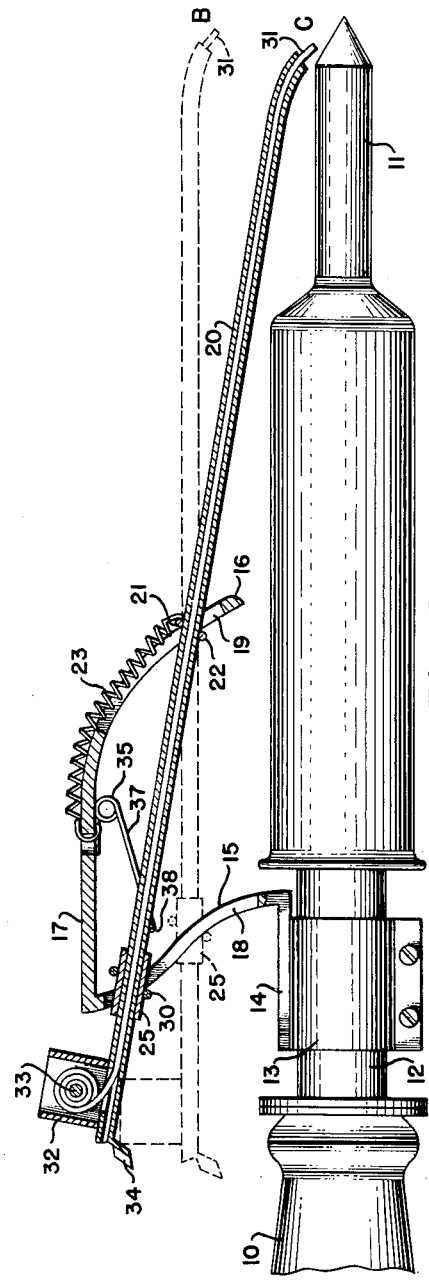
INVENTOR
Howard M. Cortner
BY Wilkinson Mawhinney & Theobald
ATTORNEYS June 6, 1961  H. M. CORTNER  2,987,023
SOLDER FEEDING DEVICE
Filed Dec. 2, 1958  2 Sheets-Sheet 2
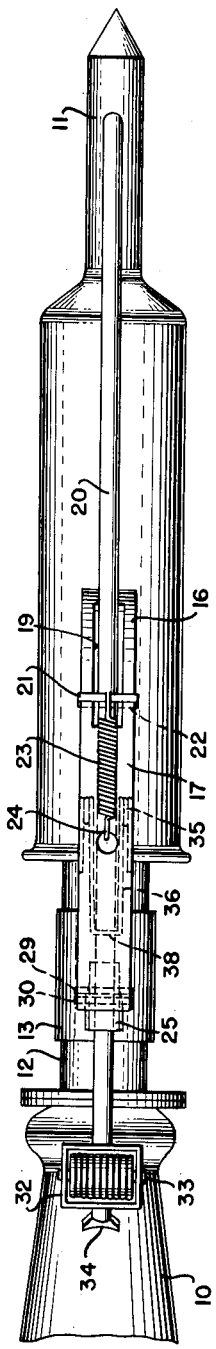
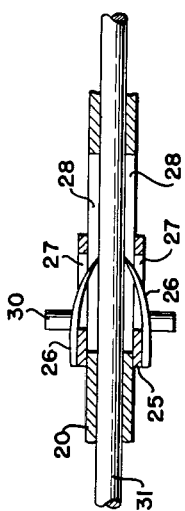
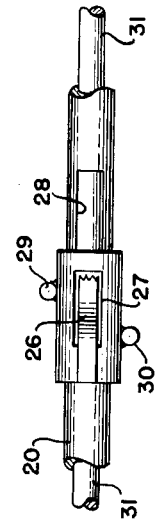
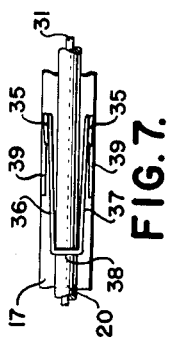
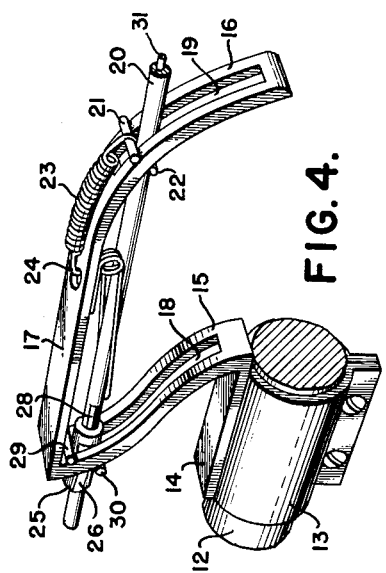
INVENTOR
Howard M. Cortner
BY Wilkinson, Mawhinney & Theibault
ATTORNEYS

2,987,023
SOLDER FEEDING DEVICE
Howard M. Cortner, Hanna City, Ill.
(1624 Garywood St., El Cajon, Calif.)
Filed Dec. 2, 1958, Ser. No. 777,687
4 Claims. (Cl. 113—109)

The present invention relates to solder feeding device and has for an object to provide a device to apply solder to the tip of the soldering iron or to the parts being soldered by means of controls located along or near the handle of the iron.

The major disadvantage of present soldering irons is that it is necessary to release the wire or part being soldered to apply the solder. This practice is unnecessarily time consuming inasmuch as it is necessary to properly orient and temporarily fasten the wire or part so that it can be released to permit the application of heat and solder.

Another object of the invention is to provide, in conjunction with a conventional soldering iron, controls which may be manipulated from the area of the handle of the soldering iron which will thereupon automatically feed the solder to a solder tube or guide and also shift this guide forwardly and downwardly whereby to apply the solder at or near the tip of the iron.

A further object of the invention is to provide a solder feeding device of a simple mechanical construction actuated in accordance with a simple mode of operation by which on the forward stroke the outer end of the ribbon of solder may be moved both forwardly and inwardly toward the axis of the soldering iron tip, and on the after movement of the device a feed means automatically operates to shift the soldering ribbon a preselected distance forwardly within the solder tube.

With the foregoing and other objects in view, the invention will be more fully described hereinafter, and will be more particularly pointed out in the claims appended hereto.

In the drawings, wherein like symbols refer to like or corresponding parts throughout the several views.

FIGURE 1 is a fragmentary side elevational view of a conventional soldering iron equipped with the present invention, also shown in side elevation in a full and dotted line position.

FIGURE 2 is a similar view showing the device of the invention in section in full lines and in dotted lines in a different position.

FIGURE 3 is a fragmentary top plan view of a form of soldering iron equipped with the present invention.

FIGURE 4 is an isometric view of the invention with the solder tube and soldering iron shank broken away and shown in section.

FIGURE 5 is a longitudinal sectional view, with parts broken away showing the solder tube and a form of solder feeding device applied thereto.

FIGURE 6 is a side elevational view of the same.

FIGURE 7 is a fragmentary bottom plan view of the soldering tube with a form of elevating spring applied thereto.

Referring more particularly to the drawings, 10 designates the handle of a conventional soldering iron, 11 the tip of and 12 the shank.

The improved device may be formulated as a unit, all carried by a clamp collar 13 affixed about the shank 12. To this clamp collar is affixed the foot or base 14 of a carrier frame comprising a rear or after guide member 15 of S or ogee curve, a forward or fore guide member 16 of arcuate form and a connecting bar 17 connecting the two guide members 15 and 16.

Slots 18 and 19 are provided in the guide members 15 and 16 which are in alignment for the passage therethrough of a solder tube 20. A fore stop rod 21 is affixed to the solder tube forwardly of the guide member 16 and is slidable up and down on the fore surface of such member 16. An after stop rod 22 is affixed to the solder tube 20 rearwardly of the guide member 16 and is adapted to slide on the rear or concave surface of such guide member 16. It will be understood that, with respect to these stop rods 21 and 22 that the intermediate portions thereof are soldered, welded or otherwise affixed above and below, respectively, to the solder tube 20 and that the same have laterally extending portions riding respectively on the convex and concave fore and aft surfaces of the forward guide member 16. By reason of the fact that these stop rods are affixed to the solder tube 20 and that they are in contact with opposite sides of the guide member 16, the solder tube 20 will not be permitted to slide through the slot 19 in a forward and aft direction but will be permitted to slide up and down in such slot following the arcuate curve thereof. The solder tube 20 and its guide or stop bars 21, 22 are biased to an upper position in the slot 19 by a coil spring 23 which is affixed at 24 to the connecting bar 17 and at its lower or forward end to the forward rod 21.

The solder tube 20 carries thereon a slidable sleeve 25 having spring jaws 26, preferably two in number arranged on opposite sides of the sleeve and entered through slots 27 in the sleeve and through slots 28 in the tube 20 (FIGURES 5 and 6). These jaws 26 are secured at their rear ends to the slidable sleeve 25 and are bowed inwardly at their forward free ends which are preferably sharpened to take a bite into the solder ribbon 31 for the purpose of advancing the same step by step through the solder tube 20.

The sleeve 25 has secured thereto an upper stop rod 29 and a lower stop rod 30. These rods are similar to the rods 21 and 22. They are affixed at their intermediate portions to upper and lower parts of the sleeve 25 and each rod 29 and 30 has laterally extending portions which ride up and down on the fore and aft surfaces respectively of the after guide member 15, it being understood that the sleeve 25 is received in the slot 18 of this after guide member 15 and slides up and down therein, being advanced forwardly as it descends and moving rearwardly on its upper ascent. In so doing the sleeve 25 slides relatively on the solder tube 20.

The solder ribbon 31 may be contained in a roll in a magazine or support 32, being coiled about a spindle 33 therein.

This magazine or support 32 is carried at the rear end of the solder tube 20 at which is also disposed a handle 34 preferably disposed in the inclined position shown for facility in simultaneously pushing the solder tube forwardly and downwardly.

As shown more particularly in FIGURES 3 and 7, the portion of the solder tube 20 just forwardly of the sleeve 25 is also biased to an upper position by a coil spring or the like having the helices 35 with depending legs 36, 37 extending down on opposite sides of the tube 20 and having a lower cross bar 38 passing beneath the tube. The upper ends 39 of the legs coming off the helices 35 are affixed beneath the connecting bar 17 in any appropriate manner.

In FIGURE 1, A designates an origin retracted position of the parts.

In dotted lines in FIGURE 2, B designates a first operational position of the device.

In FIGURE 2 in full lines C represents an applied position of the device to the tip 11 of the soldering iron.

In FIGURE 1, D represents in dotted lines a solder feeder position of the parts in operation.

The springs 23 and 35 lift the tube 20 and its sleeve 25 into the upper portions of the slots 18 and 19 to the position A which is the origin position where the tube 20 extends in substantial parallelism to the axis of the soldering iron.

By virtue of these slots 18 and 19 the tube 20 may have a forward movement relative to the axis of the soldering iron and also a radially inward movement with respect to such axis.

By applying manual pressure both forward and inward to the handle 34 the tube 20 may be made to assume the dotted line position B of FIGURE 2, the guide pins 21, 22 riding down the inwardly and forwardly curved surfaces of the forward guide member 16 and the pins 29, 30 riding down a similarly curved upper portion of the after guide member 15. This action causes the expansion of both springs 23 and 35 as shown in FIGURE 2. This operation does not move the solder actuator sleeve 25 along the tube 20. With the tube 20 in the position B, by relaxing the inward pressure on the handle 34 the tube 20 will move to the position C in FIGURE 2. This operation applies solder 31 to the tip 11 and moves the solder actuator sleeve 25 aft along the tube 20. This action is brought about by a lifting movement of the legs 36, 37 of the spring 35. In executing this movement the sleeve 25 climbs back upwardly along the upper curved portion of the after guide member 15 thereby sliding longitudinally in a rearward direction along the solder tube 20. This action will slide the jaws 26, 27 along the solder ribbon 31 without any effect thereon. By releasing all manual pressure on the handle 34, the spring 23 will return the tube 20 to the position A, and during this operation the tube 20 will move aft relatively to the solder actuator sleeve 25. During this rearward movement of the tube 20, the sleeve 25 and the jaws 26, 27 are held immovable so that the tendency of the solder ribbon 31 to move back with its tube 20 is arrested by the bowed pointed free ends of these jaws. Therefore, the movement backwardly of the tube 20 relatively to the solder ribbon 31 will expose a further increment of solder through the delivery end of the tube 20.

As shown in position D, by depressing the handle 34 from position A, the tube 20 will rock about the fulcrum 21, 22 which will hold the tube 20 from any forward sliding movement while the sleeve 25 is traversing the upper curved portion of the guide member 15. As the sleeve 25 slides down this curved portion it will be slid forwardly on the tube 20 and the jaws 26, 27 will advance the solder ribbon 31 through a predetermined degree of linear movement. The coil form of the solder ribbon in the container on the spindle 33 permits the solder to be payed off through the tube 20.

For the purpose of the claims, the rods 21, 22 and rods 29, 30, together with the sleeve 25, are slides which slide in and out on the guide members 15 and 16. These rods 21, 22 and 29, 30 have rounded or curved outer surfaces where they contact with the forward convex and after concave surfaces of the guide members 15, 16, which enables the slides together with the tube 20 to rock to the positions C and D. To aid this movement the upper rods 21, 29 may be offset forwardly with respect to the lower companion rods 22, 30 and the rods may be fitted to the guide members 15 and 16 with rather loose clearance.

It will be apparent to those skilled in the art that this invention may be applied to a gun type soldering iron as well as the conventional soldering iron.

Although I have disclosed herein the best form of the invention known to me at this time, I reserve the right to all such modifications and changes as may come within the scope of the following claims.

What I claim is:

1. A solder feeding device for a soldering iron having a shank and a tip forwardly of the shank, a frame attached to the shank, fore and aft guide members on the frame extending laterally with respect to the axis of the soldering iron and spaced along the length of the iron, both guide members having alined slots therein, the fore guide member having forwardly convex and rearwardly concave surfaces, the aft guide member curved reversely, a solder tube extending through the slots of both members, a fore slide comprising rods affixed to the tube and having end portions riding respectively on the convex and concave surfaces of the fore guide member and also rotatable thereon to enable rocking of the tube about the fore member, a first resilient means connected between the frame and said slide for biasing the forward portion of the tube to an outer position in the slot of the fore guide member, a sleeve slidable on the tube, means carried by the sleeve for advancing the solder material through the tube intermittently incident to the relative sliding of the sleeve on the tube, a second slide comprising rods affixed to the sleeve and having end portions sliding upon the reversely curved surfaces of the aft guide member, a second resilient means between the frame and the tube adjacent the sleeve biasing the aft portion of the tube and the sleeve to an outer position in the slot of the aft guide member, and a handle on the tube for pushing the tube forwardly and inwardly toward the soldering iron and also for working the sleeve slide in and out over the reversely curved portions of the aft member to cause relative reciprocation of the sleeve on the tube to activate the feed of the solder material.

2. A solder feeding device for a soldering iron having a tip forwardly of the iron, a carrier frame attached to the iron, fore and aft guide members on the frame extending laterally with respect to the axis of the soldering iron and spaced along the length of the iron, the fore guide member having forwardly convex and rearwardly concave surfaces, the aft guide member substantially in the form of an S-curve, a solder tube for solder material, fore and aft slides, said fore slide affixed to the tube and having parts slidable on the convex and concave surfaces of the fore guide member and also rotatable thereon to enable rocking of the forward portion of the tube about the fore guide member, a first resilient means connected between the frame and fore slide for biasing the forward portion of the tube to an outer position on the fore guide member, a sleeve slidable on the tube to which said aft slide is affixed, said aft slide sliding on the curved surfaces of the aft guide member, means carried by the sleeve for advancing the solder material through the tube intermittently incident to the relative sliding of the sleeve on the tube, a second resilient means between the frame and tube adjacent the sleeve biasing the aft portion of the tube and the sleeve to an outer position on the aft guide member, and a handle on the tube for pushing the tube forwardly and inwardly toward the soldering iron and also for working the sleeve slide in and out over the curved portions of the aft guide member to cause relative reciprocation of the sleeve on the tube to activate the feed of the solder material.

3. A solder feeding device for a soldering iron having a tip forwardly thereof, a frame attached to the shank, fore and aft guide members on the frame extending laterally with respect to the axis of the soldering iron and spaced along the length of the iron, the fore guide member having forwardly convex and rearwardly concave surfaces, the aft guide member curved reversely in substantially an S-form of curve, a solder tube movably containing solder material, a fore slide affixed to the tube and having portions riding respectively in and out on the convex and concave surfaces of the fore guide member and also rotatable on said fore guide member, a sleeve slidable on the tube, means carried by the sleeve for advancing the solder material through the tube stepwise incident to the relative sliding of the sleeve on the tube, an aft slide affixed to the sleeve and having portions riding upon the reversely curved surfaces of the aft member, resilient means between the frame and tube for yieldably pulling the tube to outer portions of the guide members, and a handle on the tube for pushing the tube forwardly and inwardly toward the soldering iron and also for working the sleeve slide in and out over the reversely curved portions of the aft member to cause relative reciprocation of the sleeve on the tube to activate the feed of the solder material.

4. A solder feeding device for a soldering iron having a tip on the forward end thereof, a frame having means of attachment to the iron, fore and aft guide members on the frame extending laterally with respect to the axis of the iron and spaced along the length of the iron, the fore guide member curved forwardly toward the tip and inwardly toward the iron, the aft guide member curved reversely, a solder tube having solder material movable therein, fore and aft slides movable in and out on the curved fore and aft guide members and partaking of the curved paths thereof, said fore slide affixed to the tube and rotatable on the fore guide member, a sleeve affixed to the aft slide and slidable relatively on the tube, means carried by the sleeve for advancing the solder material through the tube stepwise incident to the relative sliding of the sleeve on the tube, means for yieldably biasing the tube and slides to outer positions on the guide members, and a handle on the tube for pushing the tube forwardly and inwardly toward the soldering iron and also for working the sleeve slide in and out over the reversely curved portions of the aft member to cause relative reciprocation of the sleeve on the tube to activate the feed of the solder material.

References Cited in the file of this patent

UNITED STATES PATENTS

| | | |
|---|---|---|
| 1,631,063 | Rognley | May 31, 1927 |
| 1,871,009 | Righter | Aug. 9, 1932 |
| 2,093,527 | Petti | Sept. 21, 1937 |
| 2,604,064 | Sefton | July 22, 1952 |
| 2,843,073 | Voss et al. | July 15, 1958 |